(12) United States Patent
Hovey et al.

(10) Patent No.: US 9,877,067 B2
(45) Date of Patent: Jan. 23, 2018

(54) SYSTEM AND METHOD FOR BROADCAST-MEDIATED COORDINATION OF INTERACTIVE EXPERIENCES

(71) Applicant: DISNEY ENTERPRISES, INC., Burbank, CA (US)

(72) Inventors: Pehr Hovey, Burbank, CA (US); Jokton Strealy, Burbank, CA (US); Christina Wang, Burbank, CA (US); Johannes Tacskovics, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/154,931

(22) Filed: May 13, 2016

(65) Prior Publication Data

US 2017/0332136 A1    Nov. 16, 2017

(51) Int. Cl.
  *H04N 7/18*       (2006.01)
  *H04N 21/436*   (2011.01)
  *H04N 21/435*   (2011.01)
  *H04N 21/439*   (2011.01)
  *H04N 21/44*     (2011.01)
  *H04N 21/41*     (2011.01)
  (Continued)

(52) U.S. Cl.
  CPC ... *H04N 21/43615* (2013.01); *H04N 21/2187* (2013.01); *H04N 21/4126* (2013.01); *H04N 21/4302* (2013.01); *H04N 21/435* (2013.01); *H04N 21/4394* (2013.01); *H04N 21/44008* (2013.01)

(58) Field of Classification Search
  CPC ......... H04N 21/4781; H04N 21/43615; H04N 21/2187; H04N 21/4302
  See application file for complete search history.

(56) References Cited

U.S. PATENT DOCUMENTS 9,131,551 B2    9/2015  Hovey
2002/0016736 A1*  2/2002  Cannon ................. G06Q 30/02
                                                                  705/14.4
(Continued)

OTHER PUBLICATIONS

Gloto Syfy Sync URL:https://www.gloto.com/work/syfy-sync [retrieved on Dec. 20, 2016] 11 pgs.
(Continued)

*Primary Examiner* — Joshua Taylor
(74) *Attorney, Agent, or Firm* — Sheppard Mullin Richter & Hampton LLP

(57) ABSTRACT

Systems and methods configured to facilitate broadcast-mediated coordination of interactive experiences are presented herein. The systems and/or methods may be configured to extend the experiences of audience members at a live event to users not be physically present at the live event. A user may view a broadcast and/or recording of a live event via a presentation device, such as a television, computer, and/or other devices. Interactive user experiences may be facilitate by one or more other user devices. Interactive user experiences may include one or more of interactive content being presented on mobile computing platforms associated with the users, one or more display devices being controlled to provide an entertaining output (e.g., visual, audible, tactile, and/or other output), and/or other types of experiences.

18 Claims, 5 Drawing Sheets

(51) Int. Cl.
*H04N 21/2187* (2011.01)
*H04N 21/43* (2011.01)

(56) References Cited

U.S. PATENT DOCUMENTS

| | | | | | |
|---|---|---|---|---|---|
| 2005/0166241 | A1* | 7/2005 | Kim | ............... | H04N 5/44513 725/81 |
| 2008/0181585 | A1* | 7/2008 | Bryant | ............... | H04N 5/85 386/247 |
| 2009/0288120 | A1* | 11/2009 | Vasudevan | ......... | H04N 7/17318 725/58 |
| 2011/0103763 | A1* | 5/2011 | Tse | ............... | H04N 5/44543 386/201 |
| 2014/0304597 | A1* | 10/2014 | Einstein | ............. | H04N 21/2353 715/716 |
| 2016/0184726 | A1* | 6/2016 | Andersson | ............. | A63H 30/04 710/8 |

OTHER PUBLICATIONS

Formerly Wham City Lights; Make Amazing Lightshows URL:http://offli.ne/#/app/home [retrieved on Dec. 20, 2016] 2 pgs.

\* cited by examiner

SYSTEM AND METHOD FOR BROADCAST-MEDIATED COORDINATION OF INTERACTIVE EXPERIENCES

FIELD OF THE DISCLOSURE

This disclosure relates to broadcast-mediated coordination of interactive experiences.

BACKGROUND

Live events, such as sporting events, concerts, conventions, parades, and theme park shows, typically involve an audience passively observing a show that is produced and presented to them. In order to increase audience participation, props, signs, and/or other devices may be distributed throughout the audience and the audience members may be encouraged to utilize the objects during the show.

In some implementations, venues such as stadiums, theaters, and other venues may be equipped with infrared (IR) emitters, other optical emitters, and/or other communication devices. In order to provide a more specialized interaction during an event without large clunky electronic devices, audience members may wear articles of clothing, jewelry, toys, and/or other objects with lights and optical sensors that can be remotely triggered by the IR emitters. Thus, the emitters may coordinate a display of lights on the objects.

In some implementations, a live event may be broadcast over the Internet and/or television network to be experienced by users not physically at the live events. However, these users may lose out on some of these experiences that those who are physically present at the events get to participate in.

SUMMARY

One aspect of the disclosure relates to a system configured for broadcast-mediated coordination of interactive experiences. The system may be configured to facilitate interactive user experiences with content presented by a presentation device, such as a television, computer, and/or other devices. The content include one or more of a broadcast of a live event, a recording of a live event, and/or other content that may be presented to a user. Interactive user experiences may be facilitate by one or more user devices. By way of non-limiting example, interactive user experiences may include one or more of interactive content related to an event being presented on mobile computing platforms associated with the users, one or more display devices being controlled to provide an entertaining output (e.g., visual, audible, tactile, and/or other output), and/or other types of experiences.

The system may include one or more of non-transitory electronic storage media, one or more physical processors, and/or other components. The non-transitory electronic storage media may be configured to store experience information, and/or other information. Experience information may define an experience and/or other aspects of the system. The experience information may include one or more of control signals, synchronization information, and/or other information.

The one or more physical processors may be configured by machine-readable instructions. Executing the machine-readable instructions may cause the one or more physical processors to facilitate broadcast-mediated coordination of interactive experiences. The machine-readable instructions may include one or more computer program components. The computer program components may include one or more of a user component, a content component, a timing component, a detection component, an input component, a shop component, a control component, and/or other components.

The user component may be configured to access and/or manage one or more user identifications, user profiles, and/or user information associated with users of the system. The one or more user identifications, user profiles, and/or user information may include information stored by one or more computing platforms, one or more server, and/or other storage locations.

The content component may be configured to effectuate presentation of interactive content via individual displays of individual computing platforms. In some implementations, the content component may be configured such that effectuating presentation of interactive content via a display of a computing platform may comprise one or more of identifying content presented on a presentation device, identifying interactive content to present at the computing platform, and/or other operations.

The timing component may be configured to obtain timing information and/or other information. Timing information may specify a set of time instances associated with the presentation of content at a presentation device. Synchronization information may specify one or more time instances in the set of time instances for communicating control signals and/or other information to one or more devices.

The detection component may be configured to detect presence of one or more of individual computing platforms, individual audience display devices, and/or other devices. For example, detection component may be configured to detect presence of one or more audience display devices based on one or more signals obtained from the one or more audience display devices. Individual audience display devices may have one or more output components and/or other components.

The input component may be configured to obtain user input and/or other input. User input may be associated with presenting supplementary interactive content on a display of one or more computing platforms.

The shop component may be configured to present offers to sell instances of supplementary interactive content to users in a virtual shop. The offers may be presented to users via a shop interface.

The control component may be configured to effectuate communication of control signals via individual transmitters of individual computing platforms. The control signals may dictate control of one or more output components of the one or more audience display devices, and/or other devices. By way of non-limiting illustration, control may be exercised insofar that the one or more output components may provide output that may be in-sync with the timing information as specified by the synchronization information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As

DETAILED DESCRIPTION

Figure 1:
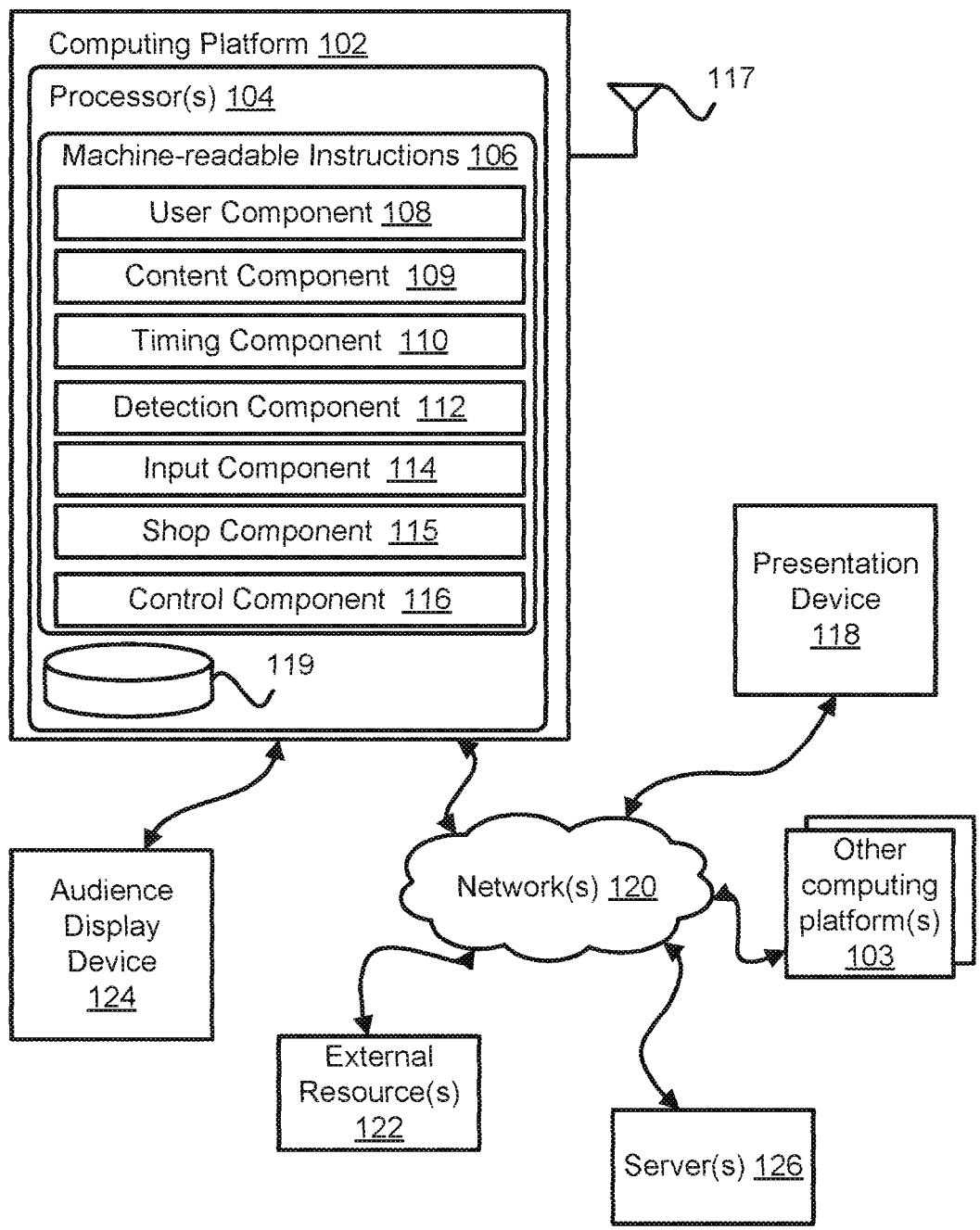
FIG. 1 illustrates a system configured for broadcast-mediated coordination of interactive experiences, in accordance with one or more implementations.

FIG. 1 illustrates a system 100 configured for broadcast-mediated coordination of interactive experiences, in accordance with one or more implementations. The system 100 may be configured to extend the experiences of audience members at a live event to users not be physically present at the live event. By way of non-limiting example, a user may view a broadcast and/or recording of a live event via a presentation device, such as a television, computer, and/or other devices. Interactive user experiences may be facilitate by one or more user devices. By way of non-limiting example, interactive user experiences may include one or more of interactive content related to event being presented on mobile computing platforms associated with the users, one or more display devices being controlled to provide an entertaining output (e.g., visual, audible, tactile, and/or other output), and/or other types of experiences.

The system 100 may include one or more of one or more computing platforms (e.g., computing platform 102 and/or one or more other computing platforms 103), one or more presentation devices (e.g., presentation device 118 and/or other presentation devices), one or more audience display devices (e.g., audience display device 124 and/or other audio display devices), one or more servers 126, and/or other components. It is noted herein that one or more references made to solely computing platform 102 are provided for illustrative purpose and are not to be considered limiting. For example, in some implementations, one or more features and/or functions attribute to computing platform 102 may be similarly attributed to individual ones of one or more other computing platforms 103.

Presentation device 118 may be configured to present content. Presentation device 118 may include a display, one or more audio reproduction devices, and/or other components. The display may comprise one or more of display screen, a touch-enabled screen (e.g., a touchscreen), a projected screen, and/or other display. In some implementations, presentation device 118 may comprise one or more of a television, a smartTV, a desktop computer, a laptop computer, a mobile device, a gaming console, and/or other device. An audio reproduction device may comprise a speaker, and/or other devices.

Content presented by presentation device 118 may include one or more of audio content, visual content, and/or other components. Audio content may comprise sound that may be reproduced through one or more audio reproduction devices of presentation device 118. Visual content may comprise one or more of images, video, and/or other visual content that may be presented via a display of presentation device 118.

In some implementations, presentations device 118 may be configured to communicate with one or more content providers and/or other resources to obtain content for presentation. A content provider may include one or more of a television provider, an internet content provider, and/or other content providers. By way of non-limiting example, presentation device 118 may obtain content via one or more of a television network, the internet, and/or by other techniques. In some implementations, presentation device 118 may be configured to obtain content from electronic storage that may be local to and/or otherwise accessible to presentation device 118. By way of non-limiting example, presentation device 118 may have access to one or more of a content library, removable electronic storage storing content for presentation (e.g., a DVD and/or other storage), and/or resources.

In some implementations, content presented by presentation device 118 may correspond to a broadcast of a live event, and/or other content. Presentation of such content may enable a user not physically present at the live event to experience the live event.

In some implementations, computing platform 102 may be configured to communicate with one or more servers (e.g., server(s) 126) according to a client/server architecture and/or other communication scheme. In some implementations, computing platform 102 may communicate with one or more other computing platforms 103 according to a peer-to-peer architecture, via communications routed through server(s) 126, and/or other communication schemes. In some implementations, computing platform 102 may communicate with presentation device 118 according to a peer-to-peer architecture, via communications routed through server(s) 126, and/or other communication techniques (see, e.g., timing component 110).

One or more users may access system 100 and/or interactive experiences via computing platform 102. Computing platform 102 may include one or more of a cellular telephone, a smartphone, a laptop, a tablet computer, a desktop computer, a television set-top box, a client device, a smart TV, a gaming console, and/or other device suitable for the intended purposes as described herein.

Computing platform 102 may include one or more of one or more physical processors 104 configured by machine-readable instructions 106, electronic storage 119, a transmitter 117, and/or other components. Executing the machine-readable instructions 106 may cause one or more physical processors 104 to facilitate broadcast-mediated coordination of interactive experiences. Computing platform 102 may be configured to present interactive content using information stored by and/or local to computing platform 102 (e.g., a game cartridge, game disk, memory card/stick, USB memory stick, electronic storage, and/or other considerations), information obtained from one or more servers 126, information obtained from one or more other computing platforms 103, and/or other information. The machine-readable instructions 106 may include one or more of a user component 108, a content component 109, a timing component 110, a detection component 112, an input component 114, a shop component 115, a control component 116, and/or other components.

Electronic storage 119 may be configured to store experience information and/or other information. Experience information may facilitate defining an interactive experience, and/or other aspects of system 100. In some implementations, experience information may include one or more of control signals, trigger signals, timing information, synchronization information, interactive content information, and/or other information.

Control signals may include one or more of commands, processes, programs, routines, instructions, and/or other information. One or more control signals may be configured for dictating control of an entity that may receive the control signals. In some implementations, control signals may include control signals as described herein with respect to audience display device 124. Briefly, control signals may convey information for controlling one or more output components of presentation device 118. By way of non-limiting illustration, output may include one or more of visual output, audio output, tactile output, and/or other output via one or more output components.

Trigger signals may include one or more of commands, processes, programs, routines, instructions, and/or other information. One or more trigger signals may be configured for dictating control of an entity that may receive the control signals. In some implementations, trigger signals may include trigger signals as described herein with respect to audience display device 124. Briefly, a trigger signal may include information related to a timing of execution of one or more control signals received by audience display device 124.

Timing information may specify a set of time instances associated with content presented at presentation device 118. In some implementations, timing information may comprise one or more of a timecode associated with the presentation of content at presentation device 118, a duration of content presented at presentation device 118, and/or other information. In some implementations, timing information may vary based on the particular content presented via presentation device 118. By way of non-limiting example, given content presented via presentation device may be specifically related with given timing information.

Synchronization information may specifying one or more time instances for communicating one or more of control signals, trigger signals, and/or other information. By way of non-limiting example, synchronization information may specifying one or more time instances within a set of time instances specified by timing information. In some implementations, synchronization information may dictate instances when interactive experiences may be effectuated via one or more of computing platform 102, audience display device 124, one or more other computing platforms 103, and/or other devices.

Interactive content information may include one or more of information defining interactive content available for presentation via computing platform 102, content relationship information, and/or other information. In some implementations, information defining interactive content may include information defining one or more of images, videos, gifs, animations, and/or content that may be presented on computing platform 102.

In some implementations, content relationship information may specify relationships between interactive content available for presentation at computing platform 102 and content presented via presentation device 118. By way of non-limiting example, content relationship information may include one or more of a look-up table, a chart, and/or other specifications that may specify relationships between interactive content available for presentation and content broadcast via presentation device 118. In some implementations, interactive content that may be presented on computing platform 102 may be content that may be related to the content presented at presentation device 118.

In some implementations, interactive content available for presentation at computing platform 102 and content presented via presentation device 118 may be related by a theme. In some implementations, a theme may comprise one or more of a subject matter of content presented via presentation device 118 (e.g., subject matter of a live event), a location depicted within the content presented via presentation device 118 (e.g., a location of a live event), a brand, a color, a time period, and/or other themes.

By way of non-limiting illustration, content presented via presentation device 118 may include a real-world fireworks show. Interactive content available for presentation at computing platform 102 may include animated graphics showing simulated fireworks, and/or other interactive content. The interactive content available for presentation at computing platform 102 and content presented via presentation device 118 may be related by a subject matter theme of "fireworks."

By way of non-limiting illustration, content presented via presentation device 118 may include an event taking place at a first real-world location. Interactive content available for presentation at computing platform 102 may include images of the first real-world location. The interactive content available for presentation at computing platform 102 and content presented via presentation device 118 may be related by a location-based theme of "the first real-world location."

By way of non-limiting illustration, content presented via presentation device 118 may include sponsored content. Interactive content available for presentation at computing platform 102 may include sponsor-branded content. The interactive content available for presentation at computing platform 102 and content presented via presentation device 118 may be related by a brand-based theme.

It is noted that the above examples describing a subject matter theme relationship, a location-based theme relationship, and a brand-based theme relationship are provided for illustrative purposes only and are not to be considered limiting. For example, in some implementations, relationships between interactive content available for presentation at computing platform 102 and content presented via presentation device 118 may be specified in other ways.

The user component 108 may be configured to access and/or manage one or more user identifications, user profiles, and/or user information associated with users of system 100. The one or more one or more user identifications, user profiles, and/or user information may include information stored by computing platform 102, server(s) 126, and/or other storage locations. The one or more user identifications, user profiles, and/or user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a computing platform identification associated with a user, a phone number associated with a user, and/or other information related to users.

The content component 109 may be configured to effectuate presentation of interactive content via a display of computing platform 102. In some implementations, a display may comprise one or more of a display screen, a touch-enabled screen (e.g., a touchscreen), a projected screen, and/or other displays.

In some implementations, content component 109 may be configured such that effectuating presentation of interactive content via a display of computing platform 102 may comprise one or more of identifying content presented via presentation device 118, identifying interactive content to present at computing platform 102, and/or other operations. In some implementations, interactive content that may be presented may be content that may be related to the content presented via presentation device 118.

In some implementations, identifying content presented via presentation device 118 may be based on identifying information that may identify the content presented via presentation device 118. By way of non-limiting example, computing platform 102 may be configured to obtain identifying information from one or more of one or more other computing platforms 103, presentation device 118, one or more servers 126, based on user input, and/or other sources for identifying content presented at presentation device 118.

In some implementations, content component 109 may be configured to obtain audio information and/or other information from presentation device 118. In some implementations, the audio information obtained from presentation device 118 may correspond to the audio content effectuated by presentation device 118. In some implementations, computing platform 102 may include one or more microphones and/or other devices configured to generate audio information based on indicate sound waves. By way of non-limiting example, computing platform 102 may "listen" to the audio content. In some implementations, the audio information may include identifying information that may identify the content presented via presentation device 118. Identifying information may include one or more of an audio fingerprint, an audio watermark, and/or other identifying information that may be specific to the content presented via presentation device 118. In some implementations, a content provider may configure audio content with identifying information.

In some implementations, content component 109 may be configured to obtain identifying information from one or more servers 126, one or more external resources 122, and/or other sources. By way of non-limiting example, an external resource may comprise a device associated with a provider of the content presented via presentation device 118. The device may be configured to communicate identifying information and/or other information to computing platform 102. By way of non-limiting example, a device may be a beacon disposed at or near presentation device 118 that may communicate identifying information and/or other information in conjunction with the presentation of content via presentation device 118.

In some implementations, users may provide input via computing platform 102 that may identify content presented via presentation device 118. By way of non-limiting example, content component 109 may be configured to effectuate presentation of a user interface via a display of computing platform 102. The user interface may include user interface elements that may be configured to receive user entry and/or selection of identifying information. By way of non-limiting illustration, the user interface may include one or more of a text input field, drop down menu, set of check boxes, and/or other user interface elements. The user interface may include different identifying information that may identify different content that may be presented via presentation device 118. Identifying information may comprise a name of the content, and/or other information.

In some implementations, content component 109 may be configured such that identifying interactive content to present at computing platform 102 may comprise identifying content related to the identified content presented via presentation device 118. By way of non-limiting example, interactive content to present at computing platform 102 may be identified based on content relationship information stored by electronic storage 119, and/or by other techniques.

In some implementations, interactive content presented a computing platform 102 may comprise virtual space content. Computing platform 102 may be configured to implement one or more instances of a virtual space executed by machine-readable instructions 106 to determine views of the virtual space. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

In some implementations, providing the virtual space may include hosting the virtual space via one or more servers 126 over network 120. By way of non-limiting example, one or more servers 126 may include machine-readable instructions that may include one or more of the same or similar components of machine-readable instructions 106 of computing platform 102. In some implementations, hosting the virtual space via server(s) 126 may comprise an "online" version of the virtual space, while hosting the virtual space by executing one or more components of machine-readable instructions 106 may comprise an "offline" version of the virtual space.

The instance of the virtual space may comprise a simulated space that is accessible by one or more users via computing platform 102 that present the views of the virtual space to the one or more users. The virtual space may include virtual space content. The virtual space content may include one or more of virtual objects, topography, and/or other virtual space content. The simulated space may express ongoing real-time interaction by one or more users, and/or include one or more objects positioned within the topography that are capable of locomotion within the topography.

In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by content component 109 is not intended to be limiting. The content component 109 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by content component 109, users may control virtual objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

The users may participate in the instance of the virtual space by providing user input for controlling one or more of the available user controlled elements in the virtual space. Control may be exercised through control inputs and/or commands input by the users through computing platform 102. The users may interact with each other through communications exchanged within the virtual space. Such communications may include one or more of textual chat, instant messages, private messages, voice communications, and/or other communications. Communications may be received and entered by the users via their respective computing platforms. Communications may be routed to and from the appropriate users through server(s) 126.

The timing component 110 may be configured to obtain timing information, and/or other information. In some implementations, timing information may be obtained from electronic storage 119. In some implementations, timing information may be obtained from other sources. By way of non-limiting example, timing information may be obtained from one or more of presentation device 118, one or more servers 126, one or more other computing platforms 103, one or more external resources 122, and/or other sources.

In some implementations, audio information obtained by content component 109 to identify content presented via presentation device 118 may further include timing information embedding in the audio information. The timing component 110 may be configured to extract from the obtain audio information, the timing information. In some implementations, a content provider may configure audio content with embedded timing information.

In some implementations, timing component 110 may be configured to obtain timing information from an external resource. By way of non-limiting example, an external resource may comprise a device associated with a provider of the content presented via presentation device 118. The device may be configured to communicate timing information and/or other information to computing platform 102. By way of non-limiting example, a device may be a beacon disposed at or near presentation device 118 that may communicate timing information, and/or other information.

Detection component 112 may be configured to detect presence of one or more of one or more audience display devices (e.g., audience display device 124), one or more other computing platforms 103, and/or other devices that may be at or near computing platform 102. In some implementations, detecting devices may be based on one or more signals being obtained from the one or more devices.

By way of non-limiting example, detection component 112 may be configured to detect audience display device 124 based on one or more signals being obtained from audience display device 124. In some implementations, audience display device 124, one or more computing platform 102, and/or computing platform 102 may communicate signals and/or other information back and forth in accordance with one or more of a discovery operation, pairing operation, and/or other operations that may facilitate mutual detection of devices. By way of non-limiting example, devices may carry out handshaking processes and/or other operations that may facilitate mutual detection of devices.

Input component 114 may be configured to obtain user input. User input may be associated with presenting supplementary interactive content on the display of computing platform 102. In some implementations, user input may be exercised through one or more input mechanisms of computing platform 102. In some implementations, user input may be exercised via touch-based input via a touch-sensitive display of computing platform 102, and/or other input mechanisms. In some implementations, touch-based user input on a portion or area of a display of computing platform 102 may effectuate presentation of supplementary interactive content at or near the portion or area of contact. User input to effectuate presentation of supplementary interactive content may be provided in other ways.

In some implementations, supplementary interactive content may comprise content that may be one or more of presented in conjunction with the display of interactive content related to the content presented via presentation device 118, a replacement (at least temporality) to the interactive content shown on the display, a modification to interactive content presented via presentation device 118, and/or other content. In some implementations, supplementary interactive content may comprise one or more of images, videos, gifs, animations, virtual items, and/or other content.

In some implementations presenting supplementary interactive content in conjunction with the display of interactive content may comprise overlaying the supplementary interactive content on the interactive content, and/or other operations.

In some implementations, replacing (at least temporality) the interactive content may comprise no longer showing the interactive content and instead showing the supplementary interactive content.

In some implementations, modifying the interactive content may comprise one or more of adding additional content to the interactive content, removing content from the interactive content, changing the interactive content, and/or other operations.

In some implementations, supplementary interactive content that may be available to a user may be supplementary interactive content that may include an inventory of supplementary interactive content associated with the user. In some implementations, available supplementary interactive content may change depending on the identification of the content presented via presentation device 118.

The shop component 115 may be configured to present offers to sell instances of supplementary interactive content to users in a virtual shop. The virtual shop may be a simulated environment which may be accessible by users and presents the views of the virtual shop to the users. Users may access the virtual shop through one of a variety of ways. In some implementations, the virtual shop may be part of the virtual space. In some implementations, the virtual shop may comprise a user interface that may be presented in response to user input requesting to view the virtual shop. Users may access the virtual shop using control inputs and/or commands input by a user through computing platform 102, and/or other way of access. By way of non-limiting example, a user may select a virtual shop button to automatically be taken to the virtual shop.

The instance of the virtual shop may be presented to users through a shop interface. The shop interface may be configured to present the offers to sell supplementary interactive content to users. The shop interface may be configured to receive entry and/or selection of individual offers by the users to effectuate acceptance and/or purchase of the offers at a virtual (or real) currency purchase price.

In some implementations, the virtual shop may be included within an instance of a virtual space. In some implementations, supplementary interactive content available for purchase by users may be presented as virtual items within the virtual space. The simulated environment of the virtual shop may have topography. The virtual shop may express ongoing real-time interaction by one or more users (e.g., may have limited stock of content for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the supplementary interactive content, and/or one or more sets of supplementary interactive content available for purchase by the users. Users may view the supplementary interactive content (e.g., individual virtual items and/or sets of virtual items) available for purchase. Users may purchase the virtual items using virtual (or real) currency. Transactions may take place with the virtual teller, through various other actions of the user within the instance of the virtual shop, and/or other offer/transaction mechanisms.

In some implementations, offers to sell supplementary interactive content may be presented to users prior to the start of a broadcast by presentation device 118. For example, prior to the start of a broadcast, users may be prompted (e.g., via a banner ad, notification, external notification, and/or other prompt) to purchase supplementary interactive content (e.g., via the virtual shop). In some implementations, offers to sell supplementary interactive content may be presented to users during a broadcast. For example, at any time during a broadcast (e.g., the start, the middle, the end, and/or at an intermediate time there between), the users may be prompted to purchase supplementary interactive content. Offers may be presented in other ways.

The control component 116 may be configured to effectuate communication of control signals and/or other information via transmitter 117 and/or other components of computing platform 102. Control signals may be communicated to one or more audience display devices and/or other devices. In some implementations, control signals and/or other information may dictate control of one or more output components of one or more audience display devices (see, e.g., audience display device 124 in FIG. 2), and/or other devices. In some implementations, the control signals may be communicated in accordance with synchronization information and/or other information. As presented herein, synchronization information may specifying one or more time instances within a set of time instances associated with content presented via presentation device 118. The control of one or more audience display devices may be configured such that the one or more output components provide output that is in-sync with the timing information in accordance with the synchronization information. In particular, the one or more output components may be configured to generate output at the one or more time instances specified by the synchronization information. This may provide a coordinated interactive experience wherein output of one or more audience display devices may be in-sync with content presented via presentation device 118 and/or interactive content presented via computing platform 102.

By way of non-limiting example, timing information may specify one or more of a first time instance during presentation of content via presentation device 118, a second time instance during presentation of content via presentation device 118, a third time instance during presentation of content via presentation device 118, and/or other time instances. Synchronization information may specify one or more the second time instance during presentation of content via presentation device 118 for communicating one or more control signals to one or more devices.

Figure 4:
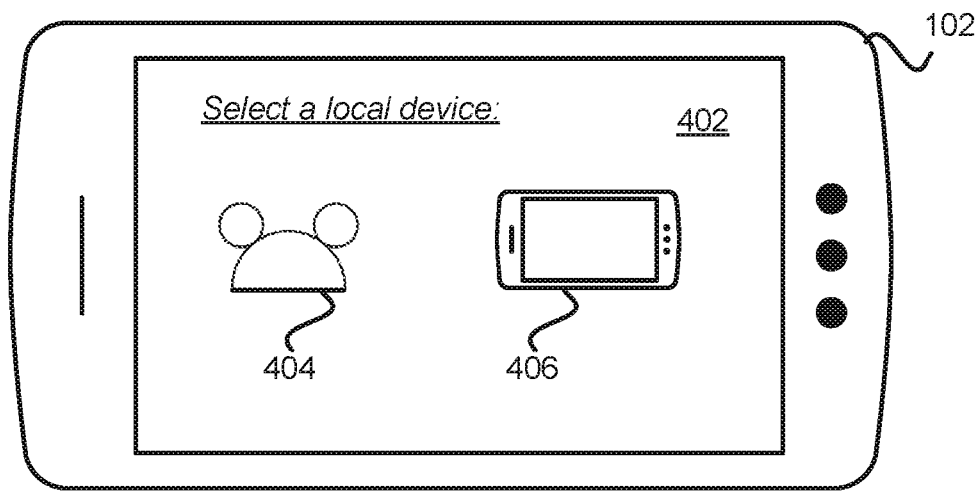
FIG. 4 illustrates an exemplary user interface presented on a display of a computing platform configured to facilitate interactive experiences.
Figure 5:
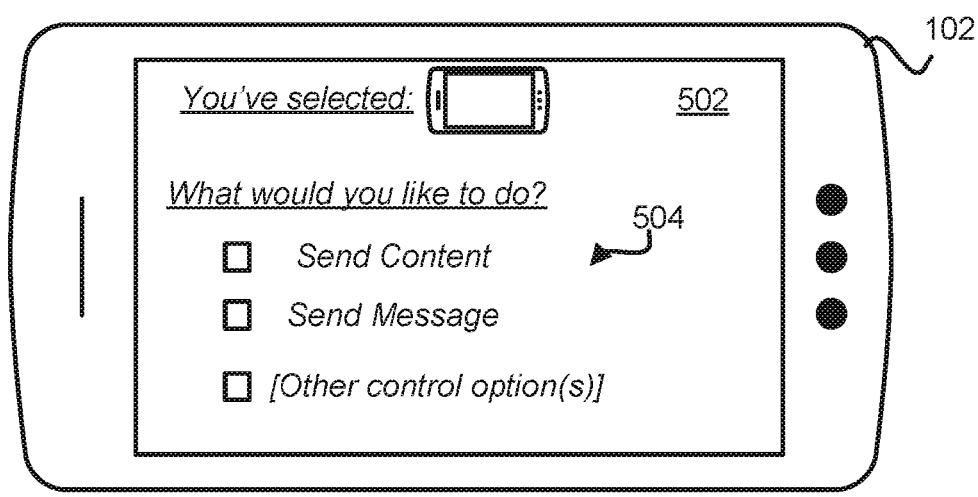
FIG. 5 illustrates another exemplary user interface presented on a display of a computing platform configured to facilitate interactive experiences.

In some implementations, control signals may communicated to individual ones of one or more other computing platform 103 in accordance with user input via one or more user interfaces (see, e.g., FIG. 4 and FIG. 5).

The control component 116 may be configured to effectuate communication of supplementary control signals and/or other information via transmitter 117 and/or other components of computing platform 102. Supplementary control signals may be communicated to individual ones of the one or more other computing platforms 103. In some implementations, the supplementary control signals may dictate control of the one or more other computing platforms 103. In some implementations, the control of the one or more other computing platforms 103 may be in accordance with user input via computing platform 102. By way of non-limiting example, supplementary control signals may include one or more of commands, instructions, and/or other information that may facilitate presenting instances of supplementary interactive content on individual ones of the one or more other computing platforms 103 in a same or similar manner as the instances of supplementary interactive content that may be presented on computing platform 102 based on user input via computing platform 102. In some implementations, supplementary control signals may include one or more of commands, instructions, and/or other information that may facilitate presenting instances of supplementary interactive content in accordance with user input via one or more user interfaces (see, e.g., FIG. 4 and FIG. 5).

Figure 2:
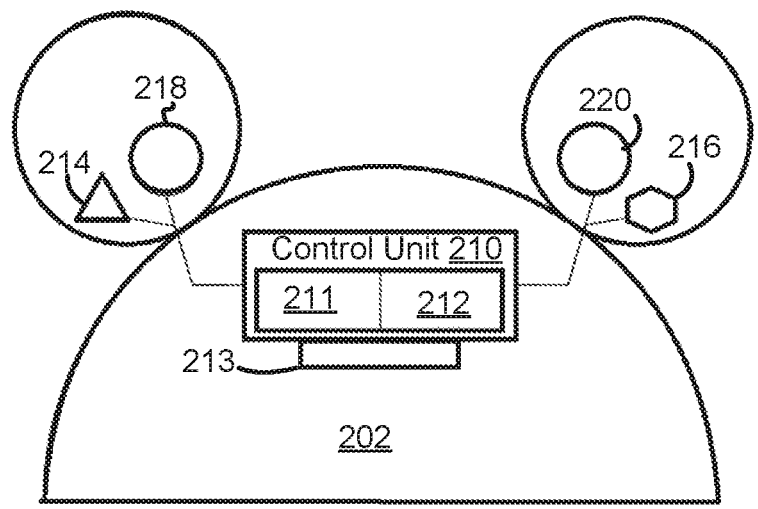
FIG. 2 illustrates an audience display device, in accordance with one or more implementations.

FIG. 2 illustrates an implementation of an audience display device 202 (e.g., the same or similar to audience display device 124 in FIG. 1). Audience display device 202 may include one or more of a control unit 210, an input node 214, an output node 216, a first visual output component 218, a second visual output component 220, and/or other components. Control unit 210 may include one or more of a processor 211, a memory 212, a power source 213, and/or other components. Power source 213 may be communicatively coupled to control unit 210 and/or other components. Control unit 210 may be communicatively coupled (e.g., wired or wirelessly) to one or more of input node 214, output node 216, first visual output component 218, second visual output component 220, and/or other components of audience display device 202.

In some implementations, audience display device 202 may be a physical object including one or more of a toy, piece of jewelry, trinket, wand, fairy wings, a prop, an article of clothing, a household fixture, and/or other physical objects. In some implementations, audience display device 202 may be an article of clothing that a user may wear. By way of non-limiting illustration, FIG. 2 illustrates audience display device 202 configured as a hat with mouse ears. However, in other implementations, it is contemplated that audience display device 202 may be another physical objects. Therefore, the present depiction is not limiting to the physical implementation of audience display device 202.

In FIG. 2, control unit 210 may include one or more of processor 211, memory 212, and/or other components. Processor 211 may be configured by machine-readable instructions. Executing the machine-readable instructions may cause processor 211 to perform one or more of: accessing memory 212; executing commands, processes, and/or programs stored in memory 212 and/or received by input node 214; and/or carrying out other operations. Processor 211 may correspond to a processing device comprising one or more of a microprocessor, a hardware processing device, a plurality of hardware processing devices, and/or other devices. However, in other implementations processor 211 may refer to other processor devices capable of performing the functions and features attributed to control unit 210.

In some implementations, memory 212 may be configured to facilitate one or more of storing commands, processes, programs for execution by processor 211, and/or other information. Memory 212 may comprise one or more of non-transitory electronic storage, ROM, RAM, flash memory, and/or other memory. In some implementations, memory 212 may comprise a plurality of memory types, modules, and/or other components. Memory 212 may be protected memory. By way of non-limiting example, memory 212 may be configured to restrict and/or prevent outside manipulation of memory 212 and/or specific portions of memory 212. Memory 212 may be configured with one or more of data encryption, locks, and/or other mechanisms that may allow access, storage, and/or retrieval of information from memory 212 only by authorized commands. By way of non-limiting example, commands and/or other information included in one or more of received trigger signals, control signals, and/or other commands may be required to meet security requirements before memory 212 may be utilized. By way of non-limiting example, a bi-directional unlock protocol and/or other authorization protocol may be utilized.

Control unit 210 may be configured to facilitate control one or more of one or more other components of audience display device 202, one or more computing platforms (see, e.g., FIG. 3), and/or other devices.

Control unit 210 may be coupled to input node 214 and/or other components. Processors 211 of control unit 210 may be configured to obtain communications via input node 214. Memory 212 may be configured to effectuate storage of obtained communications and/or other information in memory 212. Obtained and/or stored communications may be configured to initiate one or more commands by processor 211 to utilize audience display device 202, and/or other devices.

Input node 214 may be configured for one or more of wired communication via a wired connection and/or port capable of receiving a wired communication, wireless communication, and/or other types of communications. In some implementations, input node 214 may be connected to a peripheral device. The peripheral devices may be configured to receive instructions on how to operate audience display device 202. For example, input node 214 may facilitate wired connections at a kiosk and/or other devices. In some implementations, input node 214 may include a plurality of sensors configured to facilitate one or more of optical communications, radio communications, and/or wired communications. By way of non-limiting example, input node 214 may comprise one or more of an optical sensor, an ambient light sensor, radio frequency (RF) sensor, and/or other devices.

An optical sensor may comprise one or more of an infrared (IR) sensor, and/or other sensors. Optical communications may facilitate communication of line-of-sight script, code, routines, and/or other information that may be localized to a specific area. Optical communications may be suitable in an event venue where an event coordinator may wish to localize commands to a specific subset of the audience. However, in other implementations, input node 214 may include other sensors or receptors capable of receiving radio communications and/or other wireless communications.

In some implementations, input node 214 may comprise an ambient light sensor, and/or other sensors. In such an implementation, an environment may be dark such that input node 214 may sense ambient light. By way of non-limiting example, input node 214 may be configured to sense when a spotlight shines on audience display device 202. Input node 214 may be configured to generate output signals conveying a change in ambient light. Input node 214 may be configured to communicate output signals to control unit 210. Control unit 210 may be configured to cause audience display device 202 to react.

In some implementations, input node 214 may comprise an RF sensor, and/or other sensors. An RF sensor may comprise one or more of an RF antenna, and/or other sensors. An RF antenna be configured for one or more frequencies of RF reception and/or transmission. In some implementations, an RF antenna may be one or more of a directional antenna, an omni-directional antenna, and/or other type of antenna.

Input node 214 may be configured to receive communications relating to audience display device 202 and/or other devices. Input node 214 may be configured to receive signals communicated via transmitter 117 of computing platform 102 (see, e.g., FIG. 1). Received communication may include one or more of a trigger signal, a control signal, and/or other information. By way of non-limiting example, a trigger signal may comprise one or more executable commands, processes, instructions, and/or procedures receivable by audience display device 202. In some implementations, a trigger signal may include instructions to execute one or more other commands saved within memory 212 and/or one or more other commands included in a control signal. In some implementations, a trigger signal may include instructions to execute one or more other commands after a certain time period and/or with a specific delay. By way of non-limiting example, a trigger signal may specify a countdown timer and/or other information. By way of non-limiting illustration, a first trigger signal may include instructions to execute a first command saved within memory 212, and a second trigger signal may include instruction to execute the first command after a certain time period and/or with a specific delay.

A control signal may include one or more executable commands, processes, instructions, and/or procedures receivable by audience display device 202. In some implementations, a command may include code that may be executable by processor 211 of audience display device 202. Code and/or other information associated with a control signal may correspond to control of visual outputs on visual output components 218 and/or 220. Furthermore, communications may include conditions, such as communications with if/then functionality. Audience display device 202 may be configured to determine satisfaction of one or more conditions within the communication and execute and/or stop execution of a command based on the result. For example, a condition could be a value of a variable and/or output value of a function generator.

Input node 214 may be communicatively coupled to control unit 210. Processor 211 of control unit 210 may receive information (e.g., a trigger signal, control signal, and/or other information) and respond appropriately. In some implementations, processor 211 may be configured to effectuate storage of information received from input node 214 in memory 212 and/or other storage location. In some implementations, processor 211 may be configured to carry out one or more operations in response to information received from input node 214. In some implementations responsive operations may include one or more of recalling and/or executing a process and/or program stored in memory 212 and/or received via a control signal, effectuating a visual presentation on visual output components 218 and/or 220, and/or other operations.

Control unit 210 may be coupled to output node 216. Output node 216 may comprise one or more of a transmitter, an emitter, and/or other devices. Output node 216 may be configured for relaying and/or outputting information or processes as dictated by control unit 210. In some implementations, an emitter may comprise one or more of an IR emitter, other optical emitters, a radio emitter, and/or other communication emitter. Output node 216 may include one or more other output devices that may be utilized by control unit 210 to output information.

Control unit 210 may utilize output node 216 to output information. Information output by output node 216 may be configured to be received by one or more of one or more other audience display devices (not shown in FIG. 2), one or more sensors located in an environment, one or more computing platforms, and/or other devices. Output node 216 may be configured to provide audience display device 202 with the ability to communicate with other devices.

Individual ones of first visual output component 218 and/or second visual output component 220 may include one or more of a light, a light emitting diode (LED), a single die LED, a bicolor LED, a tricolor LED, and/or other devices. In some implementation, individual ones of first visual output component 218 and/or second visual output component 220 may include one or more of a red-green-blue tricolor LED and/or other multicolor LED configured to present a spectrum of visible colors. Control unit 210 may utilize one or more of first visual output component 218, second visual output component 220, and/or other visual output components to display a visual presentation according to a process executed by processor 211. It is noted that while two visual display devices are shown in FIG. 1, more or less visual output components may be included in similar or different forms. As such, one or more features and/or functions attributed to one or more of first visual output component 218 and/or second visual output component 220 may be attributed to a single visual output component and/or a plurality of visual output components.

In some implementations, processor 211 may be configured to determine one or more operations and/or commands to execute in response to received information. By way of non-limiting example, in response to one or more of a trigger signal, control signal, and/or other received information, processor 211 may be configured to determine to execute one or more of a command, a retrieval of a process and/or program stored in memory 212, storage of information in memory 212, and/or other operations or commands. Processor 211 may utilize output node 216 and/or visual output components 218 and/or 220 in accordance with one or more executed operations and/or commands.

Although visual output components 218 and/or 220 are shown in FIG. 2, in some implementations, audience display device 202 may include one or more other output components. By way of non-limiting example, one or more other output components may include one or more of an audio output component (e.g., a speaker), tactile stimulation component (e.g., a vibrator), and/or other output component. In some implementations, an audio output component may be under the control of control unit 210 to output one or more of music, speech, and/or other sounds in accordance with one or more processes and/or commands executed by processor 211. In some implementations, a tactile stimulation component may be configured to effectuate tactile sensation, such as a vibration.

Figure 3:
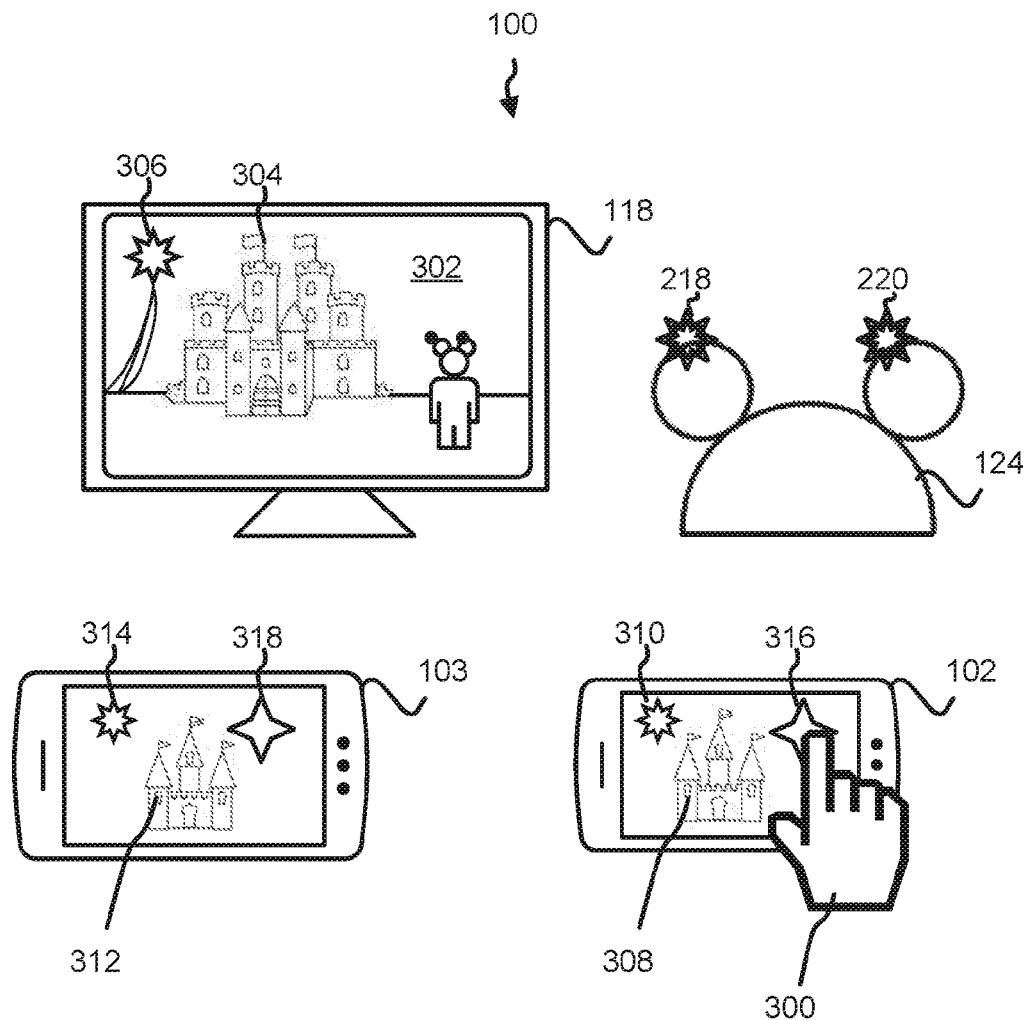
FIG. 3 illustrates an exemplary implementation of the system of FIG. 1.

FIG. 3 illustrates an exemplary implementation of system 100. Presentation device 118 may comprise a television. Audience display device 124 may comprise an audience display device such as audience display device 202 as shown and described with respect to FIG. 2. Computing platform 102 may comprise a mobile device, such as a smartphone. A second computing platform 103 may comprise a mobile device, such as a smartphone. Presentation device 118 may be configured to present content 302. Content 302 may comprise a broadcast (live or recorded) or a real-world event. The real-world event may comprise, for example, a fireworks show. The content 302 may include visual content elements, such as one or more of first visual content element 304, second visual content element 306, and/or other visual content. In some implementations, first visual content element 304 may be a view of a real-world building at the real-world location of the real-world event. Second visual content element 306 may be a view of a real-world firework explosion.

Computing platform 102 may be configured to present interactive content on a display of computing platform 102. The interactive content may be related to content 302 presented at presentation device 118. The interactive content may include one or more content elements. By way of non-limiting example, the interactive content may include one or more of a first interactive content element 308, a second interactive content element 310 and/or other interactive content. In some implementations, the first interactive content element 308 may be related to first visual content element 304. For example, first interactive content element 308 may be one or more of an image of the real-world building, an animation of the real-world building, an illustration of the real-world building, and/or other content. In some implementations, the second interactive content element 310 may be related to second visual content element 306. For example, second interactive content element 310 may be one or more of an image of a firework explosion, an animation of the firework explosion, a video of firework explosion, an illustration of the firework explosion, and/or other content. In some implementations, second interactive content element 310 may be an animation of the firework explosion that may play in-sync with the real-world firework explosion shown on presentation device 118.

Second computing platform 103 may be configured to present interactive content on a display of second computing platform 103. The interactive content may be related to content 302 presented at presentation device 118. The interactive content may include one or more content elements. By way of non-limiting example, the interactive content may include one or more of a third interactive content element 312, a fourth interactive content element 314, and/or other interactive content. In some implementations, third interactive content element 312 and fourth interactive content element 314 may comprise other instances of the same content as the first interactive content element 308 and second interactive content element 310, respectively.

A user 300 is shown providing touch-based user input via the display of computing platform 102. The touch-based user input may facilitate effectuating presentation of first supplementary content 316 on the display of computing platform 102. In some implementations, further responsive to the user input, supplementary control signals may be communicated from computing platform 102 to second computing platform 103. The supplementary control signals may facilitate effectuating presentation of second supplementary content 318 on the display of second computing platform 103. In some implementations, first supplementary content 316 and second supplementary content 318 may comprise different instances of the same content, and/or may comprise different content altogether. In some implementations, a location of presentation of second supplementary content 318 on the display of second computing platform 103 may the same or similar to the location of touch-based input by user 300 on computing platform 102.

FIG. 4 illustrate a user interface 402 presented on a display of computing platform 102 configured to facilitate interactive experiences. By way of non-limiting example, user input via user interface 402 may facilitate communicating supplementary control signals to one or more other computing platforms. The supplementary control signals may facilitate effectuating presentation of supplementary interactive content on individual ones of the one or more other computing platforms, and/or other types of experiences.

User interface 402 may include one or more user interface elements. By way of non-limiting example, the user interface elements may include representations of devices that may have been detected in the proximity of computing platform 102. By way of non-limiting example, the user interface elements may include a first user interface element 404 representing an audience display device detected in the proximity of computing platform 102, a second user interface element 406 representing another computing platform detected in the proximity of computing platform 102, and/or other user interface elements representing other devices detected in the proximity of computing platform 102. In some implementations, users may provide input of a selection of one or more of the user interface elements with which they may wish to interact with.

By way of non-limiting illustration, FIG. 5 shows a view of a user interface 502 showing one or more control options a user may select responsive to selecting one or more of the user interface elements that represent devices detected in the proximity of computing platform 102 (e.g., via user interface 402 in FIG. 4). User interface 502 may include user interface elements such as a set 504 of check boxes, and/or other user interface elements. User interface 502 may facilitate selection of control options such as sending supplementary interactive content to a selected device, sending communications to a selected device, and/or other control options. In some implementations, other control options may include selecting one or more control signals to communicate, for example if an audience display devices has been selected (via user interface 402 in FIG. 4).

Returning to FIG. 1, the computing platform 102, one or more other computing platforms 103, one or more servers 126, and/or external resources 122 may be operatively linked via one or more electronic communication links. For example, such electronic communication links may be established, at least in part, via one or more networks 120, such as the Internet and/or other networks. It will be appreciated that this is not intended to be limiting and that the scope of this disclosure includes implementations in which the computing platform 102, one or more other computing platforms 103, one or more servers 126, and/or external resources 122 may be operatively linked via some other communication media.

The external resources 122 may include sources of information, hosts, and/or providers of virtual spaces outside of system 100, external entities participating with system 100, external entities for player-to-player communications, and/or other resources. In some implementations, some or all of the functionality attributed herein to external resources 122 may be provided by resources included in system 100.

The computing platform 102 may include electronic storage 119, one or more processors 104, and/or other components. The computing platform 102 may include communication lines or ports to enable the exchange of information with a network and/or other computing platforms. Illustration of computing platform 102 in FIG. 1 is not intended to be limiting. The computing platform 102 may include a plurality of hardware, software, and/or firmware components operating together to provide the functionality attributed herein to computing platform 102.

Electronic storage 119 may comprise electronic storage media that electronically stores information. The electronic storage media of electronic storage 119 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor(s) 104, information received from server(s) 126, information received from one or more other computing platforms 103, and/or other information that enables computing platform 102 to function as described herein.

Processor(s) 104 is configured to provide information-processing capabilities in computing platform 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 109, 110, 112, 114, 115, and/or 116. Processor(s) 104 may be configured to execute components 108, 109, 110, 112, 114, 115, and/or 116 by software; hardware; firmware; some combination of software, hardware, and/or firmware; and/or other mechanisms for configuring processing capabilities on processor(s) 104.

It should be appreciated that although components 108, 109, 110, 112, 114, 115, and/or 116 are illustrated in FIG. 1 as being co-located within a single processing unit, in implementations in which processor(s) 104 includes multiple processing units, one or more of components 108, 109, 110, 112, 114, 115, and/or 116 may be located remotely from the other components. The description of the functionality provided by the different components 108, 109, 110, 112, 114, 115, and/or 116 described above is for illustrative purposes and is not intended to be limiting, as any of components 108, 109, 110, 112, 114, 115, and/or 116 may provide more or less functionality than is described. For example, one or more of components 108108, 109, 110, 112, 114, 115, and/or 116 may be eliminated, and some or all of its functionality may be provided by other ones of components 108, 109, 110, 112, 114, 115, 116 and/or other components. As another example, processor(s) 104 may be configured to execute one or more additional components that may perform some or all of the functionality attributed below to one of components 108, 109, 110, 112, 114, 115, and/or 116.

Figure 6:
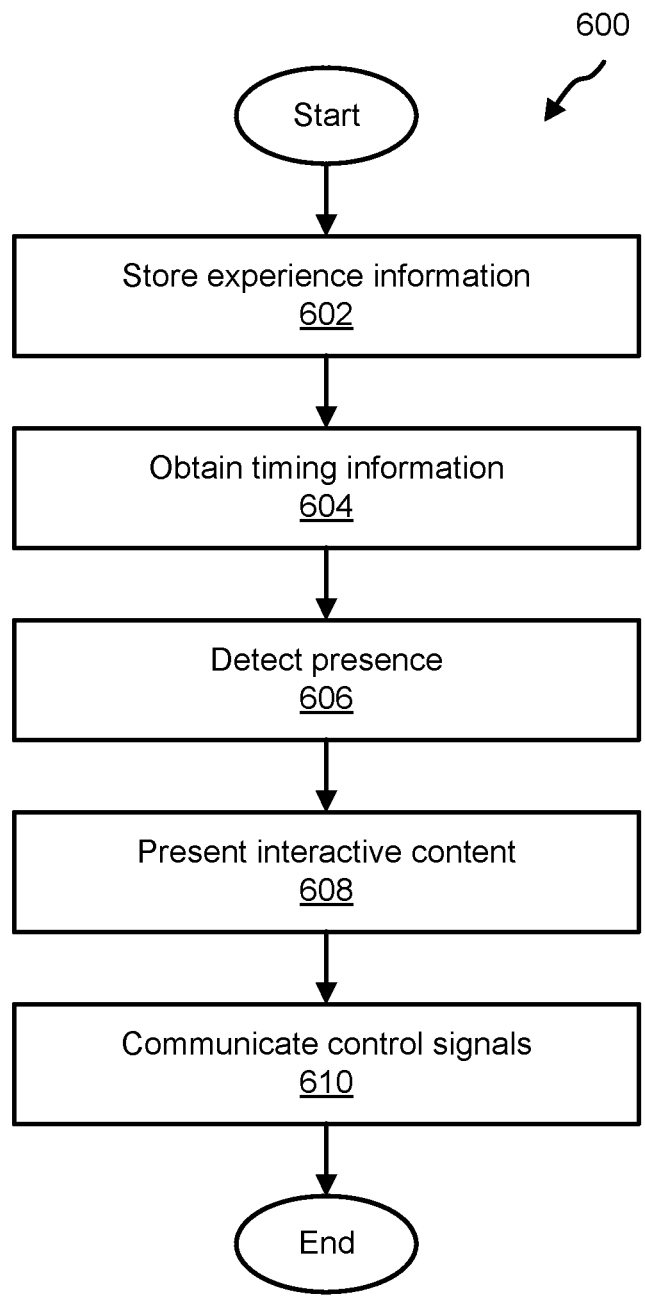
FIG. 6 illustrates a method of broadcast-mediated coordination of interactive experiences, in accordance with one or more implementations.

FIG. 6 illustrates a method 600 of broadcast-mediated coordination of interactive experiences, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in a computer system comprising one or more of one or more processing devices (e.g., a digital processor, an analog processor, a digital circuit designed to process information, an analog circuit designed to process information, a state machine, and/or other mechanisms for electronically processing information), electronic storage media storing machine-readable instructions, a transmitter, and/or other components. The one or more processing devices may include one or more devices executing some or all of the operations of method 600 in response to instructions stored electronically on electronic storage media. The one or more processing devices may include one or more devices configured through hardware, firmware, and/or software to be specifically designed for execution of one or more of the operations of method 600.

At an operation 602, experience information and/or other information may be stored. The experience information may define an experience. The experience information may include one or more of control signals, synchronization information, and/or other information. In some implementations, operation 602 may be performed by non-transitory electronic storage media the same as or similar to non-transitory electronic storage media 119 (shown in FIG. 1 and described herein).

At an operation 604, timing information and/or other information may be obtained. Timing information may specifying a set of time instances and/or other information. Timing information may be associated with content presented at a presentation device. The synchronization information may specify one or more time instances in the set of time instances for communicating control signals and/or other information to one or more devices. In some implementations, operation 604 may be performed by one or more physical processors executing a timing component the same as or similar to timing component 110 (shown in FIG. 1 and described herein).

At an operation 606, presence of one or more audience display devices and/or other devices may be detected. Presence of one or more audience display devices may be detected based on one or more signals being obtained from the one or more audience display devices. Individual audience display devices may include one or more output components and/or other components. In some implementations, operation 606 may be performed by one or more physical processors executing a detection component the same as or similar to the detection component 112 (shown in FIG. 1 and described herein).

At an operation 608, presentation may be effectuated of interactive content via a display of a computing platform. The interactive content presented on the display of the computing platform may be related to the content presented at the presentation device. In some implementations, operation 608 may be performed by one or more physical processors executing a content component the same as or similar to the content component 109 (shown in FIG. 1 and described herein).

At an operation 610, communication may be effectuated of control signals and/or other information via the transmitter. Control signals and/or other information may dictate control of one or more output components of one or more audience display devices and/or other devices. By way of non-limiting illustration, one or more output components may be controlled to provide output that may be in-sync with the timing information as specified by the synchronization information. In some implementations, operation 610 may be performed by one or more physical processors executing a control component the same as or similar to the control component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate broadcast-mediated coordination of interactive experiences, the system comprising:

a computing platform comprising:

non-transitory electronic storage media configured to store experience information, the experience information defining an experience involving the computing platform, a presentation device, and one or more audience display devices, the experience information facilitating a synchronization of the computing platform and the one or more audience display devices with the presentation device, the experience information including control signals and synchronization information;

a transmitter configured to wirelessly transmit the control signals from the computing platform to individual audience display devices, the control signals dictating control of individual sets of one or more output components included in the individual audience display devices; and one or more physical processors configured by machine-readable instructions to:

obtain timing information specifying a timing for the presentation of the content at the presentation device, the content presented at the presentation device comprising a live broadcast of a real-world event or a recording of the real-world event, the content presented at the presentation device including depictions of real-world users utilizing other audience display devices having other output components, the other output components providing output during the real-world event, wherein the synchronization information specifies one or more time instances that occur relative to the timing for the presentation of the content at the presentation device, the one or more time instances dictating when the control signals are transmitted to the individual audience display devices;

detect presence of the individual audience display devices based on signals obtained from the individual audience display devices;

effectuate presentation of interactive content via a display of the computing platform, the interactive content being related to the content presented at the presentation device; and effectuate communication of the control signals to the individual audience display devices via the transmitter as dictated by the one or more time instances specified by the synchronization information, the control signals causing the individual sets of one or more output components to provide output that is in-sync with the output of the other output components of the other audience display devices depicted in the content presented at the presentation device.

2. The system of claim 1, wherein the one or more physical processors are further configured by machine-readable instructions to:

obtain user input associated with presenting supplementary interactive content on the display of the computing platform.

3. The system of claim 2, wherein the user input comprise entry and/or selection of one or more areas of the display of the computing platform.

4. The system of claim 2, wherein the one or more physical processors are further configured by machine-readable instructions to:

detect presence of one or more other computing platforms based on other signals obtained from individual ones of the one or more other computing platforms; and effectuate communication of supplementary control signals to the individual other computing platforms, the supplementary control signals dictating control of the individual other computing platforms in accordance with the user input.

5. The system of claim 4, wherein the control of the individual other computing platforms comprises effectuating presentation of the supplementary interactive content on individual displays of the individual other computing platforms.

6. The system of claim 1, wherein the one or more physical processors are further configured by machine-readable instructions to:

identify the content presented at the presentation device; and obtain the timing information based on the identification of the content presented at the presentation device.

7. The system of claim 6, wherein identifying the content presented at the presentation device comprises:

obtaining audio information associated with the content presented at the presentation device; and identifying the content presented at the presentation device based on the obtained audio information.

8. The system of claim 1, wherein the timing information comprises a timecode associated with the presentation of content at the presentation device.

9. The system of claim 1, wherein the one or more physical processors are further configured by machine-readable instructions to:

execute an instance of a virtual space and implement the instance of the virtual space to determine views of the virtual space, wherein the virtual space includes virtual space content, the virtual space content including a simulated space expressing ongoing real-time interaction by one or more users, the simulated space having a topography and one or more objects positioned within the topography that are capable of locomotion within the topography, and wherein the interactive content presented on the display of the computing platform comprises the virtual space content.

10. A method of broadcast-mediated coordination of interactive experiences, the method being implemented in a computing platform comprising non-transitory electronic storage media, a transmitter, and one or more physical processors, the method comprising:

storing experience information, the experience information defining an experience involving the computing platform, a presentation device, and one or more audience display devices, the experience information facilitating a synchronization of the computing platform and the one or more audience display devices with the presentation device, the experience information including control signals and synchronization information, the control signals dictating control of individual sets of one or more output components included in the individual audience display devices;

obtaining timing information specifying a timing for the presentation of the content presented at the presentation device, the content presented at the presentation device comprising a live broadcast of a real-world event or a recording of the real-world event, the content presented at the presentation device including depictions of real-world users utilizing other audience display devices having other output components, the other output components providing output during the real-world event, wherein the synchronization information specifies one or more time instances that occur relative to the timing for the presentation of the content at the presentation device, the one or more time instances dictating when the control signals are transmitted to the individual audience display devices;

detecting presence of the individual audience display devices based on signals obtained from the individual audience display devices;

effectuating presentation of interactive content via a display of the computing platform, the interactive content being related to the content presented at the presentation device; and effectuating communication of the control signals to the individual audience display devices via the transmitter as dictated by the one or more time instances specified by the synchronization information, the control signals causing the individual sets of one or more output components to provide output that is in-sync with the output of the other output components of the other audience display devices depicted in the content presented at the presentation device.

11. The method of claim 10, further comprising:
obtaining user input associated with presenting supplementary interactive content on the display of the computing platform.

12. The method of claim 11, wherein the user input comprise entry and/or selection of one or more areas of the display of the computing platform.

13. The method of claim 11, further comprising:
detecting presence of one or more other computing platforms based on other signals obtained from individual ones of the one or more other computing platforms; and
effectuating communication of supplementary control signals to the individual other computing platforms, the supplementary control signals dictating control of the individual other computing platforms in accordance with the user input.

14. The method of claim 13, wherein the control of the individual other computing platforms comprises effectuating presentation of the supplementary interactive content on individual displays of the individual other computing platforms.

15. The method of claim 10, further comprising:
identifying the content presented at the presentation device; and
obtaining the timing information based on the identification of the content presented at the presentation device.

16. The method of claim 15, wherein identifying the content presented at the presentation device comprises:
obtaining audio information associated with the content presented at the presentation device; and
identifying the content presented at the presentation device based on the obtained audio information.

17. The method of claim 10, wherein the timing information comprises a timecode associated with the presentation of content at the presentation device.

18. The method of claim 10, further comprising:
executing an instance of a virtual space and implement the instance of the virtual space to determine views of the virtual space, wherein the virtual space includes virtual space content, the virtual space content including a simulated space expressing ongoing real-time interaction by one or more users, the simulated space having a topography and one or more objects positioned within the topography that are capable of locomotion within the topography, and
wherein the interactive content presented on the display of the computing platform comprises the virtual space content.

* * * * *